Aug. 25, 1970 E. GOOSSENS ET AL 3,525,820
RING CUT-OFF CIRCUIT USING REED RELAYS
Filed Oct. 16, 1968
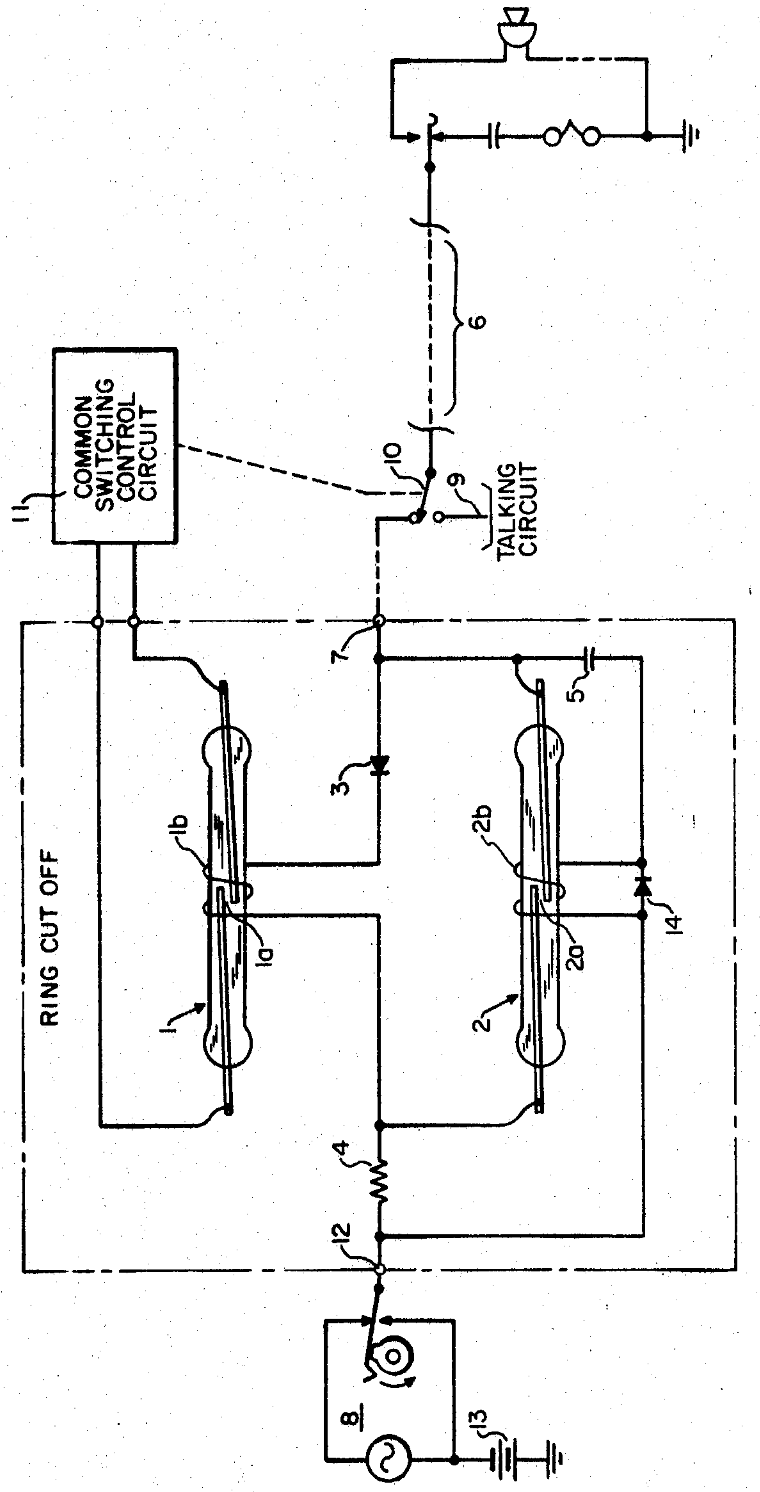
INVENTOR.
EMIEL GOOSSENS
HERMAN LABEDZ
BY
Glenn H. Antrim
ATTY.

3,525,820

RING CUT-OFF CIRCUIT USING REED RELAYS

Emiel Goossens, Aartselaar, and Herman Labedz, Rixensart, Belgium, assignors to Automatic Electric Laboratories, Inc., Northlake, Ill., a corporation of Delaware Filed Oct. 16, 1968, Ser. No. 768,129
Int. Cl. H01h *47/00;* H04m *1/26*
U.S. Cl. 179—84 5 Claims

ABSTRACT OF THE DISCLOSURE

A reed relay of the type which is inherently fast operating has its operation delayed for use as a telephone ring cut-off relay. The required delay is provided by a diode connected in series with the winding of the cut-off relay, a low-impedance operating winding of an auxiliary relay connected in shunt with the operating circuit of the cut-off relay, and contacts of the auxiliary relay connected across the winding of the cut-off relay such that the latter winding is short-circuited while the contacts of the auxiliary relay are operated during those half-cycles of ringing current when the diode in series with the winding of the cut-off relay tends to be conductive.

BACKGROUND OF THE INVENTION

This invention pertains to slow-operating electromagnetic relays and particularly to ring cut-off circuits connected to telephone stations.

In telephone systems which use telephone type relays with cores and armatures, ring cut-off relays of the telephone type have slugs on their cores and sleeves about their windings to prevent their operation during application of alternating ringing current before completion of a direct-current circuit. In systems using compact, sealed reed relays for interconnecting lines, reed relays are also incorporated into ring cut-off circuits in place of armature type relays. Since the reed relays operate relatively fast and usually have no cores to which slugs can be attached, additional circuits are required to delay their operation when they are used to control ring cut-off.

SUMMARY OF THE INVENTION

The amount of ringing current through the operating winding of a reed-type, ring cut-off relay is decreased below the amount required to cause operation of its contacts during any half-cycle of ringing current by: a diode and a resistor in series with its operating winding, the low-impedance operating circuit of an auxiliary relay connected in parallel with the operating circuit of the cut-off relay, and a pair of normally open contacts of the auxiliary relay connected in parallel with the serially connected diode and winding of the cut-off relay. The diode is obviously practically nonconductive during alternate one-half cycles of the ringing current. The operating circuit of the auxiliary relay includes its relay winding and a capacitor, and an impedance lower than the parallel operating circuit of the cut-off relay so that only a small fraction of the ringing current flows in the operating circuit of the cut-off relay. For low values of ringing current, the combined effect of the series resistance of the diode in the operating circuit of the cut-off relay and the shunting provided by the operating circuit of the auxiliary relay may be sufficient to prevent operation of the cut-off relay before a subscriber answers. When the ringing current is high, the cut-off relay still does not operate because the pair of contacts of the auxiliary relay are reoperated to short-circuit the winding of the cut-off relay before the current flow through it is sufficient to operate its contacts. The auxiliary relay may be reoperated during each half cycle, but in a preferred embodiment, a diode is connected in parallel with the winding of the auxiliary relay so that it operates only during alternate half cycles when the diode in series with the ring cut-off relay tends to be conductive.

BRIEF DESCRIPTION OF THE DRAWING

The single figure is a schematic diagram of a ring cut-off relay and its delay circuitry connected to a source of ringing current and to a subscriber's line.

DESCRIPTION OF THE PREFERRED EMBODIMENT

A ring cut-off arrangement of this invention has two similar reed relays 1 and 2, diode rectifiers 3 and 14, a resistor 4, and a capacitor 5. The relay 1 is a ring cut-off relay having a pair of normally open contacts 1*a* and an operating winding 1*b*; the relay 2 is an auxiliary relay having a pair of normally open contacts 2*a* and an operating winding 2*b*. Although the relays 1 and 2 are similar, the impedance of the winding 1*b* is much greater than the impedance of the winding 2*b* at the frequency of the ringing current.

The contact 1*a* of the cut-off relay are connected to a suitable switching circuit 11, and the switching circuit 11 is connected to transfer contacts 10 to operate them in response to the operation of the cut-off relay 1. Operation of the transfer contacts 10 transfers a subscriber's line 6 from a terminal 7 of the ring cut-off circuit, which supplies ringing current from the source 8, to a conductor 9 of a talking circuit.

The diode 3 and the auxiliary relay 2 prevent operation of the ring cut-off relay 1 during the ringing interval. One terminal of the winding 2*b* of the auxiliary relay is connected to terminal 12 which is connected to the source 8 of ringing current, and the other terminal of the winding 2*b* is connected through the capacitor 5 to the line terminal 7 of the ring cut-off circuit. The capacitor 5 has low impedance at the frequency of the ringing current so that ringing current is readily conducted through the winding 2*b* and the capacitor 5 to a ringer connected to the subscriber's line 6. Usually, the ringing current is sufficient to reoperate the auxiliary relay 2 during half-cycles. Since the relay need operate during only alternate half-cycles as described below, the diode rectifier 14 may be connected across the winding 2*b* of the auxiliary relay to prevent its operation during alternate half cycles, and thereby to decrease wear on its contacts.

The circuit for operating the ring cut-off relay 1 by direct-current flow, when the called subscriber answers, extends from the terminal 12, which is connected to the ringing source 8 and the direct-current source 13, through the resistor 4, the operating winding 1*b* of the ring cut-off relay 1, and the diode 3 to the terminal 7 connected through the transfer switch 10 to the subscriber's line. During the ringing period, the ringing current through the winding 1*b* of the cut-off relay tends to be rather low because of the resistance of the series diode 3 and the shunting effect of the winding 2*b* and its series capacitor 5. Obviously, during one-half cycle of the ringing current, the flow of current in the winding 1*b* is negligible because of the non-conductive state of the diode 3.

If the ringing current is substantial, during the other half-cycle the contacts 1*a* of the cut-off relay tend to operate and cut off ringing before the subscriber answers. This false operation of the ring cut-off relay is prevented by operation of the contcts 2*a* of the auxiliary relay 2 repeatedly during each half cycle or during each alternate half-cycle when the diode 14 is used. The diodes 3 and 14 are connected in opposite senses relative to the flow of ringing current. The contacts 2*a* are connected across a portion of the direct-current operating circuit of the cut-off relay 1 that includes the winding 1$b$ and the series diode 3. Before contacts 1$a$ of the cut-off relay have had time to operate during periods of high ringing current, the contacts 2$a$ of the auxiliary relay 2 are operated to short-circuit the winding 1$b$ of the cut-off relay so as to prevent its operation until a direct-current circuit is completed through the winding 1$b$ when the subscriber answers. When the diode 3 tends to be conductive for operating the cut-off relay 1, the diode 14 is non-conductive so as to permit the auxiliary relay 2 to operate and short-circuit the winding of the relay 1. Also, before the subscriber answers, contacts 2$a$ may need to be operated momentarily after ringing periods of normally interrupted ringing to prevent false operation of the ring cut-off relay as a result of momentary current flow caused by capacitance in the ringing cut-off circuit.

In a typical ring cut-off circuit, the cut-off relay 1 has a winding 1$b$ of 16,500 turns with a resistance of 2,300 ohms; the auxiliary relay 2 has a winding 2$b$ of 5,600 turns with a resistance of 225 ohms; the resistor 4 has a resistance value of 2,700 ohms; and the capacitor 5 has a capacitance of 14 microfarads for use at a ringing frequency of 25 Hz. The circuit operates satisfactorily when connected to a line having a single ringer or to a line having two or three ringers connected in parallel.

What is claimed is:

1. A slow-operating switching circuit having first and second reed relays, each having a pair of contacts and an operating winding, the contacts of said first relay to be operated in response to application of direct-current flow to said switching circuit but to remain unoperated in response to application thereto of alternating current with half periods substantially longer than the inherent operating time of said first reed relay alone, first and second terminals of said switching circuit to be connected to a source of alternating current and direct current, a direct-current operating circuit for said first relay including a resistor, said winding of said first relay, and a first diode connected in series between said first and second terminals, said pair of contacts of said second relay being normally open and being connected across a portion of said direct-current operating circuit including said winding of said first relay and said diode, a capacitor having low impedance at the frequency of the alternating current which is applied to said first and second terminals, said capacitor and the winding of said second relay being connected in series between said first and second terminals, and said contacts of said second relay being operated repeatedly in response to application of alternating current only to said first and second terminals, to short-circuit the winding of said first relay to prevent its operation until direct current is applied between said first and second terminals.

2. A slow-operating switching circuit according to claim 1 in which the impedance of the winding of said first relay is substantially higher than the impedance of the winding of said second relay.

3. A slow-operating switching circuit according to claim 1 in which a second diode is connected in parallel with the winding of said auxiliary relay, said diodes being connected in opposite senses relative to flow of said alternating current.

4. In a ring cut-off arrangement of the type comprising switching means interposed in the ringing circuit to operate in response to said circuit being traversed by direct current, but to remain unoperated when said circuit is traversed by alternating ringing current alone, the improvement being that said switching means comprises first and second reed relays each having a winding and a pair of contacts, said windings being respectively interposed in two parallel branches of said ringing circuit; the impedance of the winding of said first relay being greater than the impedance of the winding of the second relay, the first of said branches including a resistor and a diode in series with the relatively high-impedance winding of said first relay, and the second of said branches including a capacitor in series with the relatively low-impedance winding of said second relay; the pair of contacts of said second relay being connected in a circuit shunting said winding of said first relay, said second relay upon energization of its winding by ringing current operating on the individual half-cycles of said current to close at its contacts said shunt around the winding of said first relay, whereby said first relay is kept from operating by the flow in said ringing circuit of ringing current alone, and said first relay upon energization of its winding by flow of direct current operating to open said ringing circuit.

5. A ring cut-off circuit comprising first and second reed relays each having a pair of contacts and an operating winding, the impedance of the winding of said first relay being substantially higher than the impedance of the winding of said second relay, the contacts of said first relay being connected to a switching circuit for cutting off ringing current to a subscriber's line, a terminal for connection to both a source of alternating ringing current and a source of direct current, another terminal for connection to a subscriber's telephone line, a resistor, a diode rectifier and said winding of said first relay connected in series between said terminals, said pair of contacts of said second relay being connected across said serially connected winding of said first relay and said rectifier, a capacitor having low-impedance at the frequency of said ringing current, and said capacitor and said winding of said second relay being connected in series between said terminals, whereby said second relay operates during each half-cycle of said ringing current to prevent operation of said first relay until direct-current flow is established between said terminals.

References Cited

UNITED STATES PATENTS

| | | | |
|---|---|---|---|
| 1,329,004 | 1/1920 | MacDougall | 179—73 |
| 1,754,232 | 4/1930 | Niles et al. | 179—84 |

KATHLEEN H. CLAFFY, Primary Examiner

W. A. HELVESTINE, Assistant Examiner

U.S. Cl. X.R.

317—137